United States Patent
Griffin et al.

(10) Patent No.: US 11,240,022 B1
(45) Date of Patent: Feb. 1, 2022

(54) PASSIVE ENCRYPTION ROTATION KEYS

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

(*) Notice: Subject to any disclaimer, the term of this patent is extended or adjusted under 35 U.S.C. 154(b) by 314 days.

(21) Appl. No.: 16/382,106

(22) Filed: Apr. 11, 2019

(51) Int. Cl.
*H04L 29/06* (2006.01)
*H04L 9/08* (2006.01)
*H04L 9/06* (2006.01)

(52) U.S. Cl.
CPC .......... *H04L 9/0891* (2013.01); *H04L 9/0643* (2013.01); *H04L 2209/24* (2013.01)

(58) Field of Classification Search
CPC .. H04L 9/0891; H04L 9/0643; H04L 2209/24
See application file for complete search history.

(56) References Cited

U.S. PATENT DOCUMENTS

| | | | | |
|---|---|---|---|---|
| 4,120,030 | A * | 10/1978 | Johnstone | G06F 12/1408 713/190 |
| 8,295,492 | B2 * | 10/2012 | Suarez | H04L 9/083 380/286 |
| 8,379,850 | B1 * | 2/2013 | Bridgford | H04L 9/003 380/45 |
| 8,804,950 | B1 * | 8/2014 | Panwar | G06F 16/9014 380/28 |
| 10,979,221 | B2 * | 4/2021 | Cambou | H04L 9/0643 |
| 2003/0210783 | A1 * | 11/2003 | Filippi | H04L 9/14 380/44 |
| 2004/0151310 | A1 | 8/2004 | Fu et al. | |
| 2005/0226407 | A1 * | 10/2005 | Kasuya | G09C 1/00 380/28 |
| 2006/0251258 | A1 * | 11/2006 | Lillie | H04L 9/0891 380/270 |
| 2008/0063187 | A1 * | 3/2008 | Yoshida | H04L 9/0643 380/28 |
| 2008/0298590 | A1 | 12/2008 | Katar et al. | |
| 2009/0092252 | A1 | 4/2009 | Noll et al. | |
| 2014/0161253 | A1 * | 6/2014 | Dumchin | G09C 1/00 380/44 |
| 2014/0270163 | A1 * | 9/2014 | Merchan | H04L 9/0637 380/46 |

(Continued)

*Primary Examiner* — Sarah Su
(74) *Attorney, Agent, or Firm* — Foley & Lardner LLP

(57) ABSTRACT

In one arrangement, a method for a key management server to manage cryptographic key rotation comprises rotating, by the key management server, an initial symmetric key based on a first rotation schedule. Rotating the initial symmetric key comprises rotating bits of the initial symmetric key to create a rotated key, the rotated key being different from the initial symmetric key. The method further comprises enciphering, by the key management server using the rotated key, data sent to a first client server. In another arrangement, a method for a client server to manage cryptographic key rotation comprises rotating, by the client server, an initial symmetric key based on a schedule. The method further comprises deciphering, by the client server, data sent from a key management server using the rotated key and providing the deciphered data to a user.

17 Claims, 4 Drawing Sheets

(56) References Cited

U.S. PATENT DOCUMENTS

| | | | |
|---|---|---|---|
| 2015/0086007 A1* | 3/2015 | Mathew | H04L 9/0631 |
| | | | 380/28 |
| 2016/0105276 A1* | 4/2016 | Brumley | H04L 9/003 |
| | | | 380/28 |
| 2016/0112200 A1* | 4/2016 | Kheterpal | H04L 9/0643 |
| | | | 380/28 |
| 2017/0006018 A1* | 1/2017 | Campagna | H04L 9/088 |
| 2018/0089454 A1 | 3/2018 | Iyer et al. | |
| 2018/0091294 A1* | 3/2018 | Iyer | H04L 9/0618 |
| 2018/0167867 A1* | 6/2018 | Speight | H04L 63/0428 |
| 2019/0097794 A1* | 3/2019 | Nix | H04L 9/0662 |
| 2020/0177380 A1* | 6/2020 | Prince | H04L 9/0618 |

\* cited by examiner

PASSIVE ENCRYPTION ROTATION KEYS

BACKGROUND

Typically, cryptographic keys are replaced regularly to protect data. Methods to replace cryptographic keys include key transport (exchanging a new key), key agreement (interpolate a new key), and key derivation (extrapolate a new key). Each method has strengths and weaknesses, operational considerations, and resource issues. Symmetric keys are often managed differently than asymmetric keys because symmetric keys are randomly generated but asymmetric key pairs are mathematically constructed.

SUMMARY

In one arrangement, a method for a key management server to manage cryptographic key rotation comprises rotating, by the key management server, an initial symmetric key based on a first schedule. The first schedule is generated by the key management server and provided to a first client server. Rotating the initial symmetric key comprises shifting bits of the initial symmetric key to create a rotated key, the rotated key being different from the initial symmetric key.

In another arrangement, a method for a client server to manage cryptographic key rotation comprises rotating, by the client server, an initial symmetric key based on a schedule. Rotating the initial symmetric key comprises shifting bits of the initial symmetric key to create a rotated key, the rotated key being different from the initial symmetric key. The method further comprises deciphering, by the client server, data sent from a key management server using the rotated key and providing the deciphered data to a user.

In a further arrangement, a system for cryptographic key rotation comprises a non-transitory computer-readable medium of a key management server storing computer-readable instructions such that, when executed, cause a processor to rotate an initial symmetric key based on a schedule. Rotating the initial symmetric key comprises shifting bits of the initial symmetric key to create a rotated key, the rotated key being different from the initial symmetric key. The system further comprises causing the processor to encipher data sent to a client server using the rotated key.

In another arrangement, a system for cryptographic key rotation comprises a non-transitory computer-readable medium of a client server storing computer-readable instructions such that, when executed, cause a processor to rotate an initial symmetric key based on a schedule. Rotating the initial symmetric key comprises shifting bits of the initial symmetric key to create a rotated key, the rotated key being different from the initial symmetric key. The system further comprises causing the processor to receive enciphered data from a key management server, decipher the data using the rotate key, and providing the deciphered data to a user.

These and other features, together with the organization and manner of operation thereof, will become apparent from the following detailed description when taken in conjunction with the accompanying drawings.

DETAILED DESCRIPTION

Figure 1:
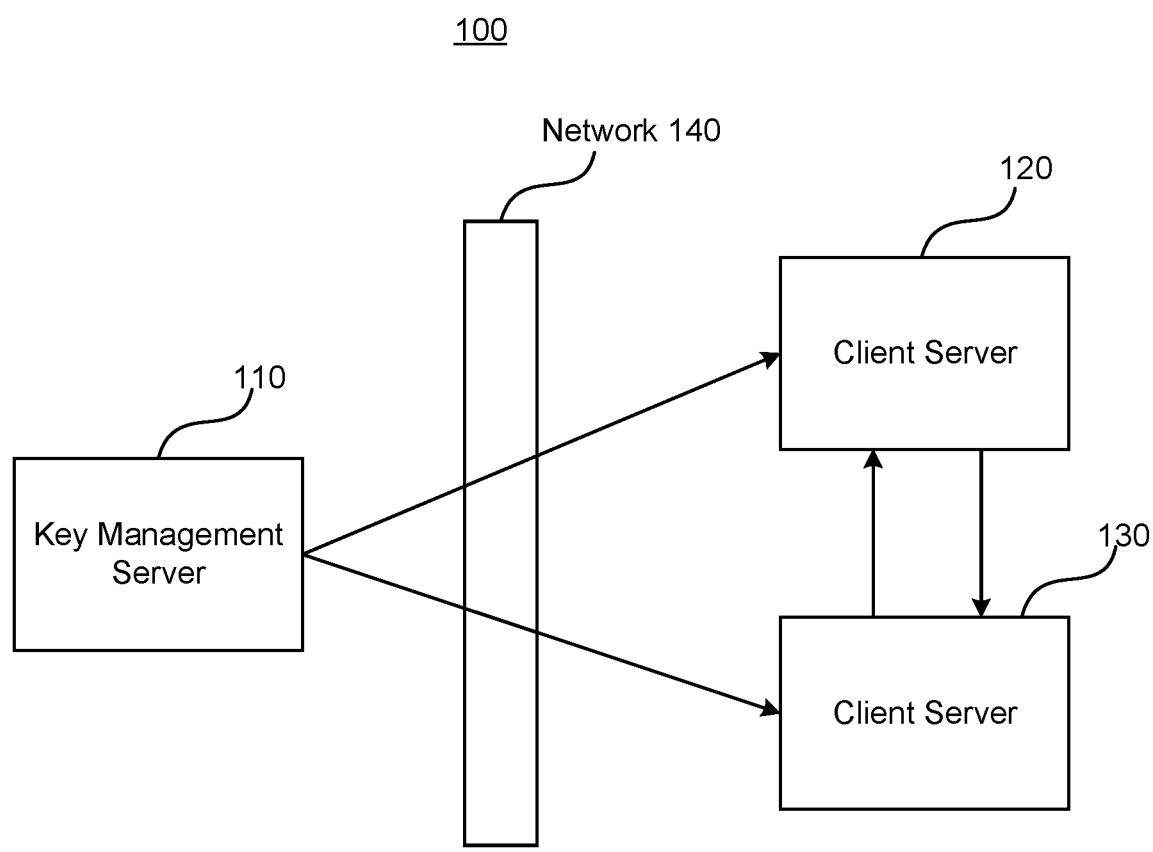
FIG. 1 is a block diagram of a system for rotating a cryptographic key, according to some arrangements.

Referring generally to the FIGS., arrangements described herein relate to systems, methods, and non-transitory computer-readable media for rotating cryptographic keys. In some arrangements, a key rotation schedule and a key rotation process are implemented by a key management server, and a client server follows the key rotation schedule and the key rotation process.

The key management server provides an initial symmetric key to the client server. The key management server also provides a key rotation schedule to the client server. To maintain confidentiality of the key rotation schedule, the key rotation schedule may be provided to the client server via non-electronic means. The key management server and the client server rotate cryptographic keys according to the schedule to provide for communication between the key management server and the client server. Multiple client servers may also have the same schedule such that communication between client servers is provided. The key rotation process can be accomplished by shifting bits of the initial symmetric key to create a new key. Bits can be shifted by shifting the most significant bits to the least significant bit position (e.g., a left circular shift). Bits can also be shifted by shifting the least significant bits to the most significant bit position (e.g., a right circular shift). Bits can also be shifted by removing the most significant bits, shifting the remaining bits to the most significant bit position, and replacing the least significant bits with a hash of the initial symmetric key.

Traditionally, cryptographic keys must be replaced regularly to avoid cybersecurity issues. The new cryptographic keys are provided by the key management server to the client servers, exposing the new cryptographic keys to the risk of being compromised. Key replacement schedules are typically automated such that key replacement can occur without human intervention, and new keys are provided by a key management server. This raises cybersecurity issues because, if a key has been compromised, the schedule to replace the key (and thus the new key, itself) may also be compromised. No conventional cryptographic key replacement process offers a way to provide a new cryptographic key without sending a new key and/or the key replacement schedule via electronic means.

Arrangements described herein automate the symmetric cryptographic key rotation process without the complexity and overhead associated with manually generating new replacement keys and transporting them securely to a server. The arrangements described herein reuse the already established key after shifting its bits to create a fresh key on a scheduled basis automatically and without the need for actions by a system administrator, thereby eliminating security risks associated with providing key replacement schemes and schedules via electronic means. The arrangements described herein relate to systems and processes to assure that cryptographic keys remain secure when they are replaced. The arrangements described herein provide this assurance by eliminating the need to send more than one cryptographic key from the key management server to the client server. Thus, the key management server sends only a single key to the client server, and key replacement occurs according to a key replacement scheme and/or schedule that includes shifting bits of the cryptographic key provided by the key management server. Accordingly, arrangements described herein improve cryptographic key security by limiting the number of cryptographic keys sent via electronic means. The arrangements described herein require no modification to provide a general purpose solution and can be used by any organization in any industry, and can be applied to any industry that desires to simplify the process of periodic key rotation on a scheduled basis to comply with key management policy requirements.

Key features and function of the arrangements described herein include the use of signcryption, though other combinations of cryptographic message syntax (CMS) types (e.g., SignedData, NamedKeyEncrypedData, EnvelopeData, etc.) could be be used to provide similar functionality. The key rotation scheduling schema is another distinguishing feature of the arrangements described herein, and there are many ways to tailor use in a given arrangement to comply with the security policy of scheduling requirements for any organization. A further distinguishing feature of the arrangements described herein is the use of bitwise shifting applied to a cryptographic key to affect passive key refreshing without replacing the key.

As defined herein, a symmetric key refers to a cryptographic key that is identical for the sender and receiver of a data transmission. Both the sender and receiver must have the same key (e.g., the symmetric key) for the data to be transmitted to the receiver such that the receiver can decipher the encrypted data. When a symmetric key is rotated by either the sender or receiver, the other party must rotate the key in the same manner such that the rotated keys match (e.g., the rotated keys are symmetric) in order for the sender and receiver to continue data transmissions. In some examples, symmetric keys are random bit strings such that the bits can be shifted to create a pseudo-random string from a random string.

As defined herein, key rotation refers to the process of shifting the bits of an existing key or existing keying material to create a new key from the existing key or existing keying material, not replacing a key with a new, randomly generated key. Terms such as "key refreshing," "key updating," etc., have substantially the same meaning as "key rotation."

As defined herein, the term "key" refers to any piece of information or data that determines the functional output of a cryptographic algorithm. The term "key" is meant to be inclusive and includes other terms such as "keying material" (e.g., the data necessary to establish and maintain a keying relationship), "cryptographic key," "secret key," "key code," "string of random bits," and the like.

FIG. 1 is a diagram of a system 100 for rotating a cryptographic key, according to some arrangements. The system 100 includes a key management server 110, a client server 120, a client server 130, and a network 140. Each of the key management server 110, the client server 120, and the client server 130 is a computing system having suitable processing, storage, and networking capabilities.

The key management server 110 generates and distributes initial symmetric keys for various client servers. The key management server 110 may be, include, or be included by a cryptographic module such as, but not limited to, a hardware security module (HSM). In some arrangements, the key management server 110 generates and distributes a unique initial symmetric key for each client server such that the client servers cannot exchange encrypted communications. In other arrangements, the key management server distributes the same initial symmetric key to each client server such that the client servers can exchange encrypted communications.

The key management server 110 may also generate and distribute a schedule for rotating the initial symmetric key. The schedule may include the scheme by which the initial symmetric key is rotated (e.g., rotation with carry, rotation without carry, etc.) and/or when the initial symmetric key is rotated (e.g., on a specific date, after a specific number of transmissions, etc.). In some arrangements, the schedule is unique for each client server to prevent the client servers from generating the same rotated cryptographic key. In other arrangements, the schedule is the same for each client server such that the client servers generate the same cryptographic key, providing for communication between client servers.

The client server 120 and the client server 130 receive symmetric cryptographic keys from the key management server 110 via the network 140. In some arrangements, the client server 120 does not engage in data transmissions with the client server 130. In such cases, the client server 120 may receive a symmetric cryptographic key from the key management server 110 that is different from the symmetric cryptographic key received by the client server 130. Furthermore, the client server 120 may receive a key rotation schedule that is different from key rotation schedule received by the client server 130. In some arrangements, the client server 120 engages in data transmissions with the client server 130. To provide for such communications, the key management server 110 provides the same symmetric key to the client server 120 and the client server 130. In addition, to provide assurance that the client server 120 and the client server 130 will maintain the ability to communicate, the client server 120 may receive a key rotation schedule that is equivalent to the key rotation schedule received by the client server 130.

Figure 2A:
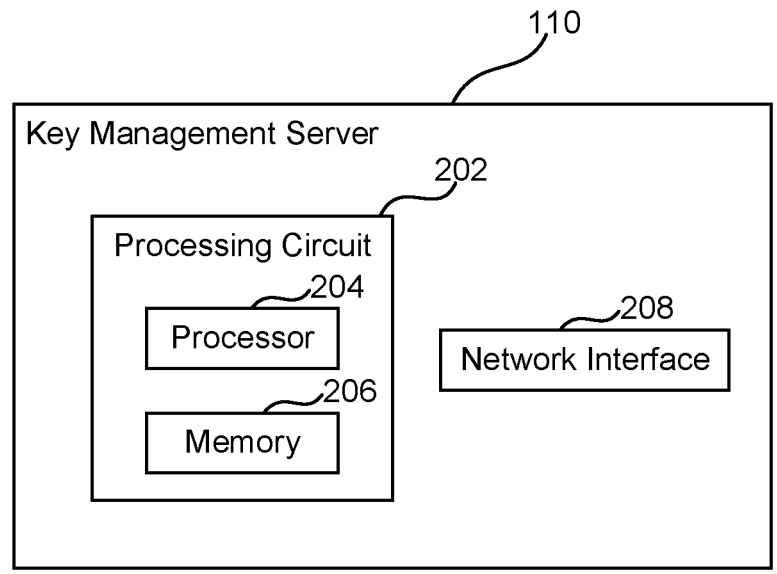
FIG. 2A is a block diagram of an example of a key management server, according to some arrangements.

FIG. 2A is a diagram of the key management server 110 shown in FIG. 1, according to some arrangements. The key management server 110 is shown to include various circuits and logic for implementing the operations described herein. More particularly, the key management server 110 includes one or more of a processing circuit 202 and a network interface 208. While various circuits, interfaces, and logic with particular functionality are shown, it should be understood that the key management server 110 includes any number of circuits, interfaces, and logic for facilitating the operations described herein. For example, the activities of multiple circuits are combined as a single circuit and implemented on the same processing circuit (e.g., the processing circuit 202), as additional circuits with additional functionality are included.

In some arrangements, the processing circuit 202 has a processor 204 and a memory 206. The processor 202 can be implemented as a general-purpose processor, an application specific integrated circuit (ASIC), field programmable gate arrays (FGPAs), a digital signal processor (DSP), a group of processing components, or other suitable electronic processing components. The memory 206 stores data and/or computer code for facilitating the various processes described herein. The memory 206 can be implemented as random access memory (RAM), read-only memory (ROM), non-volatile random access memory (NVRAM), Flash Memory, hard disk storage, and the like. Moreover, the memory 206 is or includes tangible, non-transient volatile memory or non-volatile memory. Accordingly, the memory 206 includes database components, object code components, script components, or any other type of information structure for supporting the various activities and information structures described herein.

The network interface 208 is configured for and structured to communicate data over the network 140. For example, the network interface 208 is configured for and structured to send an initial symmetric key and/or a key rotation schedule to the client server 120 and/or the client server 130. Accordingly, the network interface 208 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

Figure 2B:
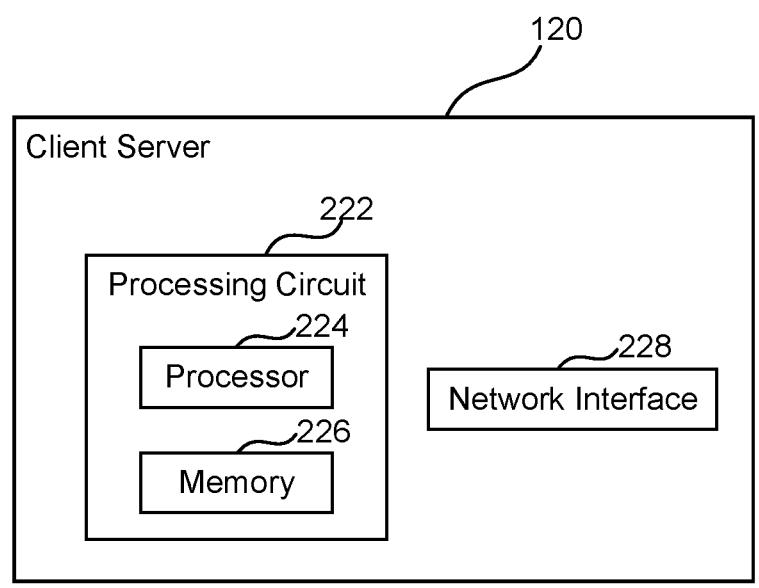
FIG. 2B is a block diagram of an example of a client server, according to some arrangements.

FIG. 2B is a diagram of an example of the client server 120 shown in FIG. 1, according to some arrangements. Though the client server 120 is shown, it will be understood that the client server 120 is representative of any client server (e.g., the client server 130) that may be in communication with the key management server 110. The client server 120 is shown to include various circuits and logic for implementing the operations described herein. More particularly, the client server 120 includes one or more of a processing circuit 222 and a network interface 228. While various circuits, interfaces, and logic with particular functionality are shown, it should be understood that the client server 120 includes any number of circuits, interfaces, and logic for facilitating the operations described herein. For example, the activities of multiple circuits are combined as a single circuit and implemented on the same processing circuit (e.g., the processing circuit 222), as additional circuits with additional functionality are included.

In some arrangements, the processing circuit 222 has a processor 224 and a memory 226. The processor 222 can be implemented as a general-purpose processor, an ASIC, FGPAs, a DSP, a group of processing components, or other suitable electronic processing components. The memory 226 stores data and/or computer code for facilitating the various processes described herein. The memory 226 can be implemented as RAM, ROM, NVRAM, Flash Memory, hard disk storage, and the like. Moreover, the memory 226 is or includes tangible, non-transient volatile memory or non-volatile memory. Accordingly, the memory 226 includes database components, object code components, script components, or any other type of information structure for supporting the various activities and information structures described herein.

The network interface 228 is configured for and structured to communicate data over the network 140. For example, the network interface 228 is configured for and structured to receive an initial symmetric key and/or a key rotation schedule from the key management server 110. The network interface 228 is further configured for and structured to receive and/or transmit data to/from the client server 130. Accordingly, the network interface 228 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

Figure 3:
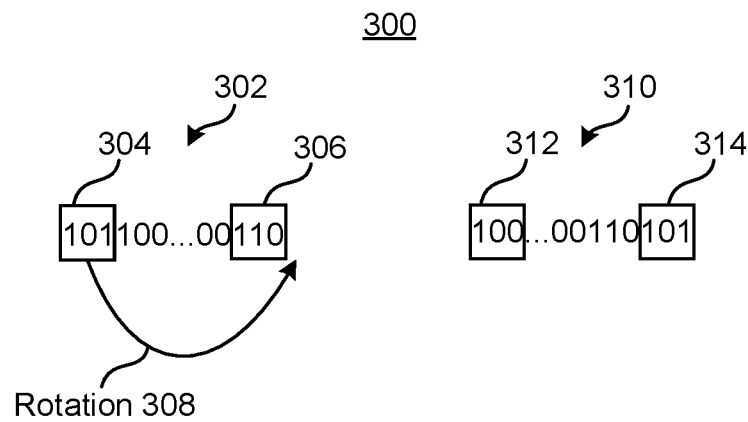
FIG. 3 is a diagram of an example of a rotation of a cryptographic key, according to some arrangements.

FIG. 3 is a diagram of an example of a rotation 300 of an initial symmetric key 302, according to some arrangements. The rotation 300 can be a circular shifting process, whereby some bits of a symmetric key are shifted from one end of the symmetric key and appended to the other end of the symmetric key. For example, the rotation 300 is shown to include the initial symmetric key 302, a most significant bits portion (MSBP) 304, a least significant bits portion LSBP) 306, a rotated key 310, a shifted most significant bits portion (SMSBP) 312, and a shifted least significant bits portion (SLSBP) 314.

The initial symmetric key 302 is distributed by the key management server 110 to at least one client server (e.g., the client server 120) such that the key management server 110 and the client server 120 have identical initial symmetric keys 302. In some arrangements, the initial symmetric key 302 is a 128-bit key based on the Advanced Encryption Standard (AES). In other arrangements, the initial symmetric key 302 is an AES 256-bit key.

The MSBP 304 (e.g., the highest order bit portion) is the bit position having the greatest value. Though the MSBP 304 is shown as a group of three binary digits, any number of binary digits can be grouped to create a most significant bits portion (e.g., 1 bit, 10 bits, etc.). The number of binary digits grouped as the MSBP 304 is dictated by the rotation schedule provided to the client server 120. The rotation schedule provides the timing of the key rotation and the scheme for the key rotation. In some arrangements, the rotation schedule may dictate that the key will be rotated on the fifth day of every month. In other arrangements, the rotation schedule may dictate that the key will be rotated after every fifth transmission between two entities. The actual rotation timing can vary as the parties involved in the transactions choose.

In some arrangements, the rotation schedule may dictate that the key will be rotated by the most significant three binary digits in the key (e.g., the MSBP 340). In other arrangements, the rotation schedule may dictate that the key will be rotated per some other, non-constant, function. For example, the rotation schedule may incorporate a Fibonacci sequence such that the number of bits to be shifted increases for each rotation as the Fibonacci sequence increases (e.g., 1, 1, 2, 3, 5, etc.). In addition, as a sequence such as the Fibonacci sequence increases, the number of bits to shift may be higher than the actual number of bits (e.g., 377). In such cases, the key may have a rotation value equal to the number of bits in the key (e.g., an AES 256 bit key has a rotation value of 256 bits) and the actual number of bits to shift may be based on the modulo function (mod) of the Fibonacci number. The modulo function returns the remainder after dividing one number by another. In the case of the Fibonacci number 377, taking the modulo of 377 and 256 (e.g., the number of bits in the initial symmetric key 302) provides a remainder of 177. Therefore, the number of bits in the initial symmetric key 302 to shift is 177. Implementing the modulo function provides the ability to include other methods to generate the bit shifting number (e.g., random numbers of any length, prime numbers of any length, etc.) because using the modulo of any number relative to the number of bits in the key will return a value within the number of bits available to shift.

As shown in FIG. 3, the circular shifting process of rotation 300 is implemented by moving the MSBP 304 per the rotation 308, thereby moving the MSBP 304 behind the LSBP 306. By rotating the initial symmetric key 302 in this manner, the rotated key 310 is created. The rotated key 310 includes the SMSBP 312 that is different from the MSBP 304. In addition, the RLSBP 314 is not equivalent to the LSBP 306. Thus, by implementing a circular shifting process, the rotated key 310 is created. Accordingly, a new cryptographic key (e.g., the rotated key 310) is created without the key management server 110 providing a new cryptographic key to the client server 120 via the network 140, providing for a more secure key replacement process.

The circular shifting process of the rotation 300 can also be described as a rotation with carry (e.g., the most significant bits are removed and become the least significant bits). The circular shifting process of the rotation 300 can also be described as a bitwise circular shift. Bitwise circular shifts are typically available in the instruction sets of many computers. For example, the Java code "return Integer.rotateRight(bits, k)" shifts bits off of one end of an integer value and appends them to the other end of the value. As shown in FIG. 3, the bits are shifted to the left in the direction of the MSBP 304. However, in some arrangements, the bits can be shifted to the right in the direction of the LSBP 306. In yet other arrangements, the bits can be shifted either to the left or to the right in a random fashion.

Shifting the bits of the initial symmetric key 302 in this fashion does not change the strength of the rotated key, because no entropy (e.g., randomness collected by an operating system or application for use in cryptography) is added or lost during the key rotation process.

Figure 4:
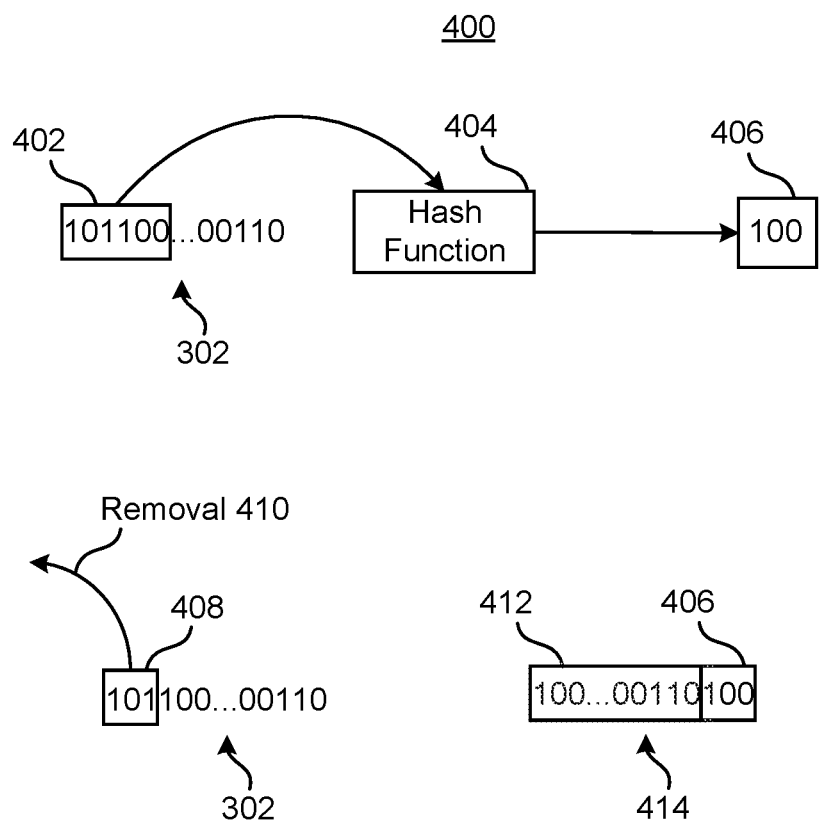
FIG. 4 is a diagram of another example of a rotation of a cryptographic key, according to some arrangements.

FIG. 4 is a diagram of another example of a rotation 400 of the initial symmetric key 302 of FIG. 3, according to some arrangements. The rotation 400 can be a bit replacement process, whereby some bits of a symmetric key are removed from one end of the symmetric key and new bits are appended to the other end of the symmetric key. For example, the rotation 400 is shown to include the initial symmetric key 302, a hash portion 402, a hash function 404, a hash value 406, a most significant bit portion (MSBP) 408, a shifted bit portion 412, and a rotated key 414.

Prior to initiating any bit replacements on the initial symmetric key 302, the hash function 404 is applied to the hash portion 402. The hash function 404 operates like a traditional hash function, whereby exposing data of any length to the hash function 404 returns a value of a fixed length. For example, as shown in FIG. 4, the hash portion 402 includes 6 bits. After going through the hash function 404, the hash portion 402 is modified to the hash value 406, which includes 3 bits. This process of creating hash values of a specified size can be executed on the initial symmetric key 302 to create a list of different hash values that can be used during the rotation 400. As a non-limiting example, a list of hash values including 3 bits can be created by taking random samples of 12 bits of the initial symmetric key 302 and running those samples through the hash function 404. As another non-limiting example, a list of hash values including 5 bits can be created by taking random samples of 18 bits of the initial symmetric key 302 and running those samples through the hash function 404. In other words, hash values of any size can be created by the hash function 404 by sampling the bits of the initial symmetric key 302. In some arrangements where a number of bits (e.g., 6 bits) of an existing key is to be replaced, an entire AES-256 key can be used as the input, and the 6-bit output can be chosen based on some other scheme. In some arrangements, a fixed identifier can be appended to the input to generate an output unique to a specific implementation. In some arrangements, a random input parameter can be provided by the key management server 110 concatenated to the input.

The hash values created by the hash function 404 are used in the rotation 400. The rotation 400 is implemented by removing the MSBP 408 from the initial symmetric key 302 per the removal 410. The MSBP 408 is shown as including 3 bits, but a portion of any length can be used, as long as the length of the MSBP 408 is the same length as the hash value 406. After the MSBP 408 is removed, the remaining bits in the initial symmetric key 302 (e.g., the shifted bit portion 412) are shifted to replace the MSBP 408. This shift leaves a space at the end of the key of a length equal to the number of bits in the MSBP 408. This space is filled by the hash value 406 such that the rotated key 414 is created, and the rotated key 414 is the same length as the initial symmetric key 302. In some arrangements, a list of hash values is created such that, for each rotation 400, a different hash value 406 is used to create a new rotated key 414.

The bit replacement process of rotation 400 can also be described as rotation without carry (e.g., replacing the most significant bits with results returned from a hash of the initial key prior to bit rotation without carry).

Figure 5:
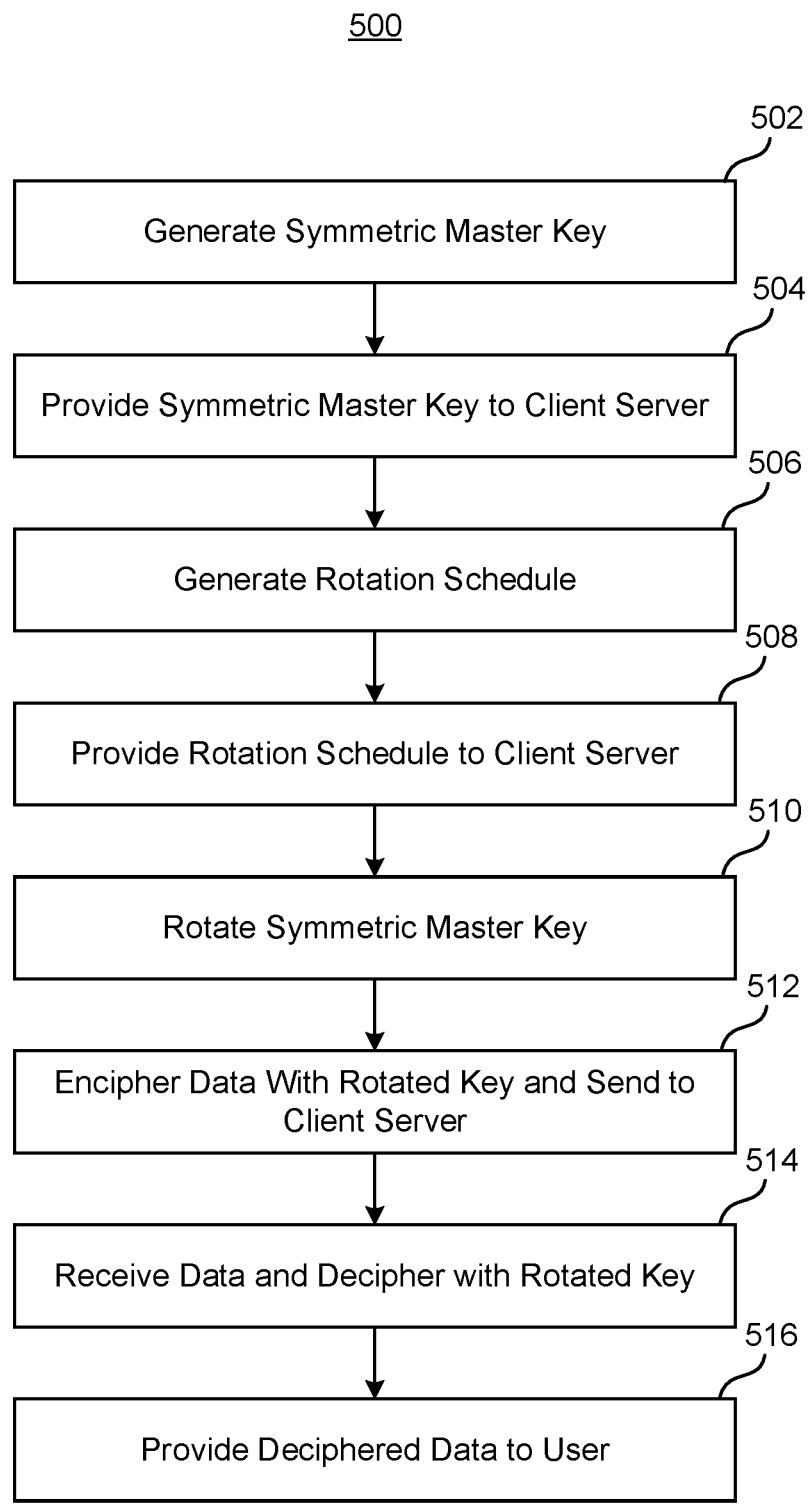
FIG. 5 is a flow diagram illustrating a method for rotating a cryptographic key, according to various arrangements.

FIG. 5 is a flow diagram illustrating a method 500 for rotating a cryptographic key, according to various arrangements. The method 500 can be performed by the key management server 110 and/or the client server 120.

At 502, the key management server 110 generates an initial symmetric key. For example, the key management server 110 may generate the initial symmetric key 302. The initial symmetric key is of a sufficient length to provide for secure communications between parties (e.g., 128 bit, 256 bit, etc.).

At 504, the initial symmetric key 302 is provided to a client server. In one example arrangement, the key management server 110 sends the initial symmetric key 302 to the client server 120 via the network 140. In another example arrangement, the key management server 110 sends the initial symmetric key 302 to the client server 120 and the client server 130 via the network 140. In some arrangements, the initial symmetric key 302 (e.g., a single key) may be distributed to a single server using the signcrypted-envelope mode of a SignCryptedData message. In other arrangements, the initial symmetric key 302 may be distributed to multiple servers using the signcrypted-attributes mode of the SigncryptedData message.

At 506, the key management server 110 generates a rotation schedule. As described, the rotation schedule may include when the key is rotated (e.g., the timing of the rotation), and the scheme by which the key is rotated (e.g., the rotation scheme). As one non-limiting example of rotation timing, the rotation schedule may dictate that the key is rotated based on time (e.g., every day, every other day, etc.). As another non-limiting example of rotation timing, the rotation schedule may dictate that the key is rotated based on the number of transmissions between parties (e.g., every fifth transmission, every tenth transmission, etc.). As one non-limiting example of a rotation scheme, the rotation schedule may dictate that the key is rotated by implementing a bitwise circular shift with carry, as in FIG. 3. As another non-limiting example, the rotation schedule may dictate that the key is rotated by implementing a rotation without carry, as in FIG. 4. As yet another non-limiting example, the rotation schedule may be based on a handshake between the key management server and the client server. For example, the key may not be rotated based on a regular schedule, but it may be rotated as needed. When the key management server 110 has data to transmit to the client server 120, the key management server 110 contacts the client server 120 and notifies the client server 120 to rotate the key based on the rotation scheme. After confirmation that the client server 120 rotated the key based on the rotation scheme, the key management server 110 sends the data to the client server 120. The transmission can also be initiated by the client server 120.

At 508, the key management server 110 provides the rotation schedule to the client server. In some arrangements, the client server 120 and the client server 130 will not be transmitting data between them. In such arrangements, the key management server 110 provides a first rotation schedule to the client server 120 and a second rotation schedule to the client server 130, with the first rotation schedule being different from the second rotation schedule. By providing the client server 120 and the client server 130 with different schedules, the client server 120 and the client server 130 will never have the same key after rotating from the initial initial symmetric key 302.

In some arrangements, the client server 120 and the client server 130 will be transmitting data between them. In such arrangements, the key management server 110 provides the same rotation schedule to both the client server 120 and the client server 130. By providing the client server 120 and the client server 130 with the same schedule, the client server 120 and the client server 130 will always have the same key as the keys are rotated according to the schedule provided.

In some arrangements, the schedule is provided to the client server 120 and the client server 130 as described. In some arrangements, the schedule is provided in such a manner as to assure confidentiality of the schedule is maintained. As a non-limiting example, the schedule may be distributed to the client server 120 and the client server 130 by printing out the schedule document and physically mailing the document to the managers of each of the client server 120 and the client server 130. By sending the schedule in this manner (e.g. in a non-electronic manner), there is assurance that the rotation schedule is not compromised by a cybersecurity issue. The managers can choose to implement the rotation schedule as desired (e.g., manually carrying out the rotations per the schedule, programming the server to carry out the schedule, etc.).

As another non-limiting example, the schedule may be saved to an electronic storage device (e.g., external hard drive, CD, DVD, USB drive, SD card, etc.) and physically mailed to the managers of each of the client server 120 and the client server 130. By sending the schedule in this manner (e.g., in a non-electronic manner), there is assurance that the rotation schedule is not compromised by a cybersecurity issue. The managers can use the electronic storage device to load the rotation schedule to the server locally such that the rotation schedule is followed by the client server 120 and the client server 130.

As yet another example, the schedule may be distributed with the initial symmetric key 302, provided that the initial symmetric key 302 and the schedule are distributed using the signcrypted-attributes mode of the SigncryptedData message.

At 510, the initial symmetric key 302 is rotated. For example, in order to assure key security, the initial symmetric key 302 will be rotated per the rotation schedule as soon as it is received. In doing so, the rotated key is secure because the rotation schedule is not accessible to parties other than those to whom the schedule is sent. Thus, even if the initial symmetric key 302 is somehow compromised, after the first rotation the rotated keys will be secure.

In some arrangements, the initial symmetric key 302 will be rotated as described with reference to FIG. 3 (e.g., a bitwise circular shift or bitwise shifting with carry). In some arrangements, the initial symmetric key 302 will be rotated as described with reference to FIG. 4 (e.g., a circular shift without carry). In some arrangements, the rotation of the initial symmetric key 302 will be implemented manually, as described (e.g., by a client server manager). In other arrangements, the rotation of the initial symmetric key 302 will be implemented automatically (e.g., by the client server directly).

The bitwise shifts have been described as a circular shift without carry or a circular shift with carry. However, other bitwise operations can be used to create a rotated cryptographic key. For example, the bitwise operations can include arithmetic shifts (e.g., left and right shifts) and logical shifts. In an arithmetic shift, the bits that are shifted from either the left or the right end of the key are discarded. In a left arithmetic shift, zeroes are shifted in on the right side. In a right arithmetic shift, the sign bit is shifted in on the left to preserve the sign of the operand. In a logical shift, zeroes are shifted in to replace the discarded bits.

At 512, data is enciphered with a rotated key. As one non-limiting example, the key management server 110 may need to communicate with the client server 120. The key management server 110 enciphers data using the rotated key 310 (or, for example, the rotated key 414) such that the data can only be deciphered by a party that holds the same rotated key. After enciphering the data, the data is sent to the client server 120. As another non-limiting example, the client server 120 may need to communicate with the client server 130. The client server 120 enciphers data using the rotated key 310 (or, for example, the rotated key 414) such that the data can only be deciphered by a party that holds the same rotated key. After enciphering the data, the data is sent to the client server 130.

At 514, the enciphered data is received. As one non-limiting example, the client server 120 receives the data from the key management server 110. Because the client server 120 rotated the initial symmetric key per the same rotation schedule as the key management server 110, the client server 120 has the same key as the key management server 110 (e.g., the rotated key 310 or the rotated key 414). The client server 120 uses the rotated key 310 (or, for example, the rotated key 414) to decipher the data sent by the key management server 110. As another non-limiting example, the client server 130 receives the data from the client server 120. Because the client server 120 and the client server 130 rotated the initial symmetric key 302 per the same rotation schedule, the client server 130 has the same key as the client server 120 (e.g., the rotated key 310 or the rotated key 414). The client server 130 uses the rotated key 310 (or, for example, the rotated key 414) to decipher the data sent by the key management server 110.

At 516, the deciphered data is provided to a user. For example, after the data is deciphered, it can be understood by the recipient. Thus, a user connected to the client server 120 can view and understand the message sent by the key management server 110. As another example, a user connected to the client server 130 can view and understand the message sent a user connected to the client server 120.

In some arrangements, after the transmission is complete, the key is rotated per the schedule as described. For example, if the transmission was between the key management server 110 and the client server 120, the rotated key 310 (or, for example, the rotated key 414) will be rotated per the schedule provided by the key management server.

In some arrangements, a key rotation across all entities may be required after a transmission between fewer than all entities. For example, after the key management server 110 and the client server 120 engage in a transmission, the key management server 110, the client server 120, and the client server 130 (and potentially other servers) may all be required to rotate their keys per the rotation schedule. This type of relationship may be required if it is necessary for each server to have access to the transmission of other servers, for example.

In other arrangements, a key rotation across all entities may not be required after a transmission between fewer than all entities. For example, after the key management server 110 and the client server 120 engage in a transmission, the key management server 110 and the client server 120 will rotate their keys per the rotation schedule. However, the client server 130 may not be required to rotate its key per the rotation schedule. Therefore, each entity may be required to maintain multiple keys if the keys are specific to transmissions between itself and another entity. For example, if the key management server 110 and the client server 120 used the rotated key 310 to transmit data, after the transmission another rotation may be required, thereby creating a new rotated key. However, the client server 130 may still use the rotated key 310 to transmit data to the client server 120 because the client server 130 was not required to rotate its key after the transmission between the key management server 110 and the client server 120. Therefore, the client server 120 must maintain the rotated key 310 until all the entities with which it communicates have rotated past the rotated key 310. At such a time when the rotated key 310 will no longer be used, the rotated key 310 can be destroyed, providing the data that was encrypted by the rotated key 310 becomes encrypted by the new rotated key.

In some arrangements, the key management server 110 transmits a key set identifier to the client server 120 prior to sending a data transmission. The key set identifier is a unique identifier that corresponds to a specific key used to encrypt and decrypt data. The key set identifier provides the client server 120 with information related to the key that the key management server 110 will use when transmitting the data. Using a key set identifier notifies the client server 120 which key must be used to receive the data, and to avoid rotating the key during the data transmission, which would prevent the transmission from being completed. In some arrangements, the key set identifier is a numerical code that corresponds to the specific key being used. In some arrangements, a list of key set identifiers can be distributed with the key rotation schedule such that there is a unique key set identifier corresponding to each key. In other arrangements, a key set identifier is generated with each key rotation such that the parties rotating the key based on the same schedule will generate the same key set identifier.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present invention.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for a key management server to manage cryptographic key rotation, the method comprising:
    rotating, by the key management server, an initial symmetric key based on a first schedule, the first schedule being generated by the key management server and provided to a first client server;
    wherein rotating the initial symmetric key comprises shifting bits of the initial symmetric key in a bitwise shifting process to create a rotated key, the rotated key being different from the initial symmetric key, the bitwise shifting process comprising:
    removing a most significant bits portion;
    shifting a least significant bits portion to replace the most significant bits portion; and
    adding a new least significant bits portion such that the rotated key is the same length as the initial symmetric key, the new least significant bits portion being generated by a hash function of the initial symmetric key.

2. The method of claim 1, wherein the initial symmetric key comprises the most significant bits portion, the least significant bits portion, and a remaining bits portion, the most significant bits portion comprising at least one most significant bit, the least significant bits portion comprising at least one least significant bit, and the remaining bits portion comprising bits that are neither the at least one most significant bit nor the at least one least significant bit.

3. The method of claim 2, wherein the bitwise shifting process comprises:
    removing the most significant bits portion;
    shifting the least significant bits portion and the remaining bits portion to replace the removed most significant bits portion; and
    adding the removed most significant bits portion to the rotated key such that the rotated key is the same length as the initial symmetric key.

4. The method of claim 2, wherein the bitwise shifting process comprises:
    removing the least significant bits portion;
    shifting the most significant bits portion and the remaining bits portion to replace the removed least significant bits portion; and
    adding a new most significant bits portion such that the rotated key is the same length as the initial symmetric key.

5. The method of claim 1, wherein the first schedule defines when the rotated key is rotated based on a number of transmissions sent between the first client server and the key management server.

6. The method of claim 1, wherein the first schedule defines when the rotated key is rotated based on a calendar date.

7. The method of claim 1, wherein the rotated key is rotated when the key management server and a client server execute a negotiation handshake, the negotiation handshake comprising confirmation from the key management server and the first client server that the rotated key is rotated before sending a data transmission.

8. The method of claim 1, further comprising:
providing, by the key management server, the initial symmetric key to a second client server;
generating, by the key management server, a second schedule for rotating the initial symmetric key for the second client server, the first schedule being different from the second schedule; and
providing, by the key management server, the second schedule to the second client server.

9. The method of claim 8, wherein rotating the initial symmetric key based on the first schedule creates a first unique rotated key and rotating the initial symmetric key based on the second schedule creates a second unique rotated key, the first unique rotated key being different from the second unique rotated key.

10. The method of claim 9, wherein rotating the initial symmetric key comprises generating a first unique identifier, the first unique identifier corresponding to the first unique rotated key.

11. The method of claim 10, wherein rotating the first unique rotated key comprises creating a third unique rotated key, and wherein rotating the first unique rotated key comprises generating a third unique identifier, the third unique identifier corresponding to the third unique rotated key.

12. The method of claim 8, wherein the first client server rotating the initial symmetric key based on the first schedule creates a first rotated key, and wherein the second client server rotating the initial symmetric key based on the second schedule creates a second rotated key, the first rotated key being equivalent to the second rotated key.

13. A method for a client server to manage cryptographic key rotation, the method comprising:
rotating, by the client server, an initial symmetric key based on a schedule, wherein rotating the initial symmetric key comprises shifting bits of the initial symmetric key in a bitwise shifting process to create a rotated key, the rotated key being different from the initial symmetric key, the bitwise shifting process comprising:
removing a most significant bits portion;
shifting a least significant bits portion to replace the most significant bits portion; and
adding a new least significant bits portion such that the rotated key is the same length as the initial symmetric key, the new least significant bits portion being generated by a hash function of the initial symmetric key;
deciphering, by the client server, data sent from a key management server using the rotated key; and
providing, to a user, the deciphered data.

14. The method of claim 13, wherein the initial symmetric key comprises the most significant bits portion, the least significant bits portion, and a remaining bits portion, the most significant bits portion comprising at least one most significant bit, the least significant bits portion comprising at least one least significant bit, and the remaining bits portion comprising bits that are neither the at least one most significant bit nor the at least one least significant bit.

15. The method of claim 14, wherein the bitwise shifting process comprises:
removing the most significant bits portion;
shifting the least significant bits portion and the remaining bits portion to replace the removed most significant bits portion; and
adding the removed most significant bits portion to the rotated key such that the rotated key is the same length as the initial symmetric key.

16. The method of claim 13, wherein the schedule defines when the rotated key is rotated based on a number of transmissions sent between the client server and the key management server.

17. The method of claim 13, wherein the schedule defines when the rotated key is rotated based on a calendar date.

* * * * *